June 18, 1963 M. A. RUDNER 3,094,585
FLUOROCARBON RESIN MIXTURES AND METAL TO PLASTIC BONDING
Filed April 16, 1951
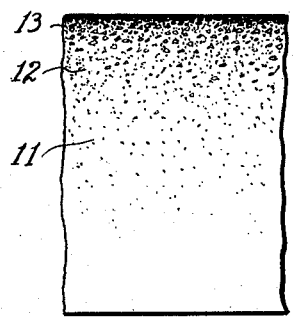
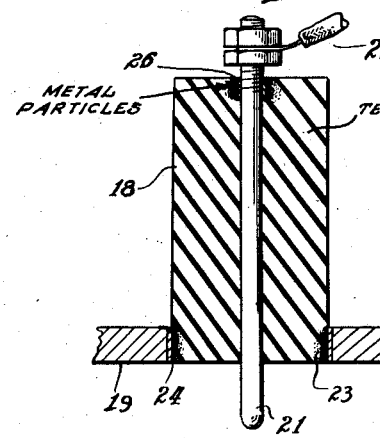
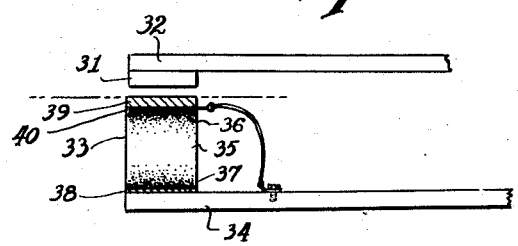
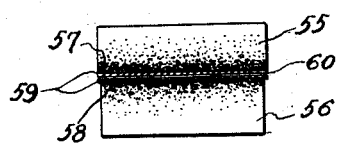
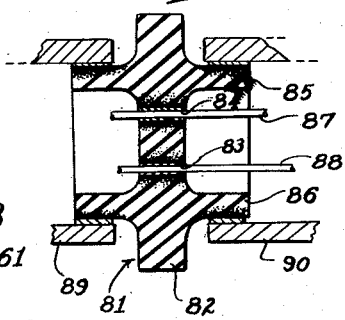
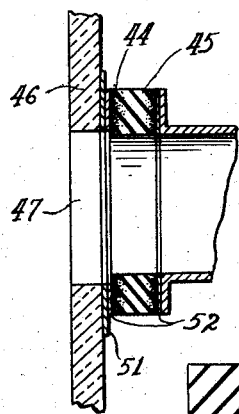
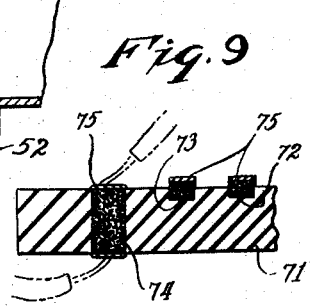
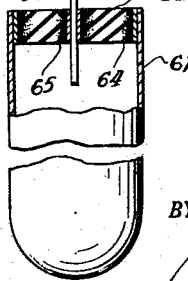
INVENTOR.
Merritt A. Rudner
BY
ATTORNEY

United States Patent Office 3,094,585
Patented June 18, 1963

3,094,585
FLUOROCARBON RESIN MIXTURES AND
METAL TO PLASTIC BONDING
Merritt A. Rudner, Camden, N.J., assignor, by mesne assignments, to Garlock Inc., Palmyra, N.Y., a corporation of New York
Filed Apr. 16, 1951, Ser. No. 221,197
11 Claims. (Cl. 174—77)

This invention relates to fluorocarbon resins made up as raw material products, from which commercial products may be made, and to completed articles of manufacture made from such resins, as well as to the processes for making the products and articles.

Two fluorocarbon resins are presently commercially available that have chemical, physical and electrical characteristics which make them suitable materials for many applications. One of those materials, polytetrafluoroethylene, is made and sold under the trademark Teflon; and the other is polymonochlorotrifluoroethylene, sold under the trademark Kel-F.

One of the striking physical characteristcs of Teflon and of Kel-F are their ability to resist wetting and sticking. It is therefore impervious to water and moisture. The resistivity of these materials is very high. The power factor is low. Those characteristics combine to make these materials excellent base materials for electronic applications. The non-sticking characteristic makes those materials excellent for many applications, where for example, food products are processed, since the food products will not stick to the surface of a plate or sheet of these materials.

These materials are provided in their raw state as powders, which may be formed and molded by pressure and heat to any simple shapes that may be desired. The materials may also be formed in bar or sheet stock and then machined to shape, where complex shapes are desired that may not be readily adapted to simple molding or extruding operations, for example.

One of the common applications for which these materials have been applied, is for use in gaskets. When any material is employed as a gasket, the anti-leak pressure forces which are utilized are ordinarily developed by means of associated cooperating mechanical members. The same procedure has ordinarily been employed with Teflon and Kel-F gaskets. Similarly, where a member made of Teflon or of Kel-F has been used as a spacing insulator, for example, suitable mechanical structures, and structural combinations, have been utilized to support the member as an insulator. In practically all cases where it has been employed in the past for its insulating characteristic, external means have been required to support the body as a spacing medium to provide the proper insulation in the region where such insulation was wanted. Because of the non-surface sticking characteristic of Teflon and of Kel-F, it has been considered impossible, and, in fact, it has been impossible, heretofore, to provide a direct physical bonding between the Teflon or Kel-F body and any external material or member, either to support the Teflon or Kel-F, or to utilize the Teflon or Kel-F as a support for the external material or member.

Another major feature and object of this invention, therefore, is to provide a process whereby a quantity of Teflon or Kel-F raw material may be treated to form an integral body having a metallic layer cohesively bonded to its surface.

Another object of the present invention is to provide a process for forming Teflon and Kel-F bodies with a metallic surface to which an electric conductor may be easily and readily soldered.

Another object of this invention is to provide a Teflon or Kel-F body with a metallic surface layer strongly bonded thereto, in order to provide a metallic surface which may be soldered or brazed to an external mechanical surface, to provide relative support between the body and that external member, so that the external member may support the body, or so the body may support the external metallic member.

Another object of the invention is to provide a Teflon or Kel-F body with surface layers of metal bonded thereto at different selected areas of the body, in order that the body may be sealed to one mechanical member, and, serve, in turn, to support a second mechanical member, with the body serving both as a sealing element and as a supporting element, with shock-absorbing properties to enable the supported element to withstand operational vibrations that would otherwise subject the supported member to excessive stresses.

Another object of the invention is to provide a shock-absorbing seal between a glass vessel and an external mechanical member, by the utilization of a shock-absorbing layer of Teflon or Kel-F having bonded metal surface layers which may be respectively physically connected between a metalized surface of the glass vessel and an external metallic connection for example, to an external vacuum producing system.

Another object of the invention is to provide a shock resistant contact, consisting of a Teflon or Kel-F sandwich, in which a Teflon or Kel-F body is provided with a bonded metallic surface on one side, for mechanical connection to an external actuating member, and in which the body supports a substantial contact element on the other side of the body, by connection to a metallic surface layer on that other surface of the body.

Another object of the invention is to provide a Teflon insulating body provided with metallic surface layers on selected areas of the insulator body, so that the insulator body may be assembled in a sealed system, to serve, for example, both as a support and as a sealing member in a coaxial cable.

The operation and features of the invention, and the advantages thereof, may be readily appreciated and understood on reference to the accompanying description and drawings, in which FIG. 1 is a schematic view of a quantity of Kel-F or Teflon material in its pure state, with superposed layers of Kel-F or Teflon-metal mixes in powdered form, before it is compressed and sintered;

FIG. 2 is a similar view showing the relative section and height of the quantity of material of FIG. 1, as an integral body, after compression and sintering;

FIG. 3 shows the structure of FIG. 2 after the application of a surface layer of metal;

FIG. 4 shows a schematic vertical section of an insulator consisting of a treated Kel-F or Teflon body, disposed to be mechanically supported by direct mechanical bonding to an external mechanical member, and, inversely, to mechanically support a separate metal conductor as a terminal;

FIG. 5 is a schematic sectional view of a contact member utilizing a Kel-F or Teflon body as an insulator to support an electrical contact and to provide a shock-absorbing base for the contact;

FIG. 6 shows schematically an arrangement whereby a Kel-F or Teflon body may be mechanically bonded to a metallized glass surface to provide a flexible stress-absorbing and sealing medium for connection between a glass vessel and an external conduit, or the like;

FIG. 7 shows a schematic arrangement whereby two Kel-F or Teflon bodies may be directly mechanically joined through the medium of soldering two bonded metallic surfaces on the respective bodies;

FIG. 8 is a vertical view, partially in elevation, and partially in section, of a vessel, such as a condenser can, sealed and closed by a Teflon or Kel-F header;

FIG. 9 is a sectional view of a Teflon or Kel-F base used for a so-called "printed circuit" arrangement; and FIG. 10 is a sectional view of a guide support for a two-wire shielded cable.

In accordance with the principles of this invention, in order to form a Teflon or Kel-F body with a metallic surface layer, a portion of the body is treated to serve as a transition region, by adding distributed powdered metal to the powder to establish a mixture, between a zone in the body and the surface, that varies gradually, but homogeneously, in increasing metallic content, from the zone of pure Teflon or Kel-F to the surface layer. In that manner, the transition is made gradually from Teflon or Kel-F to metal, through a region of gradually increasing metallic content, to a planar region at the surface, at which the metallic content is the maximum that the Teflon or Kel-F can hold. In that manner the metallic surface that is exposed is then sufficient to receive and retain a metal bond, such as, for example, a bond that may be formed by a solder, or by electro-deposition, or by low temperature brazing.

Although, in principle, the gradual variation and increase of metallic content provides an ideal disposition of the metallic content, a commercially satisfactory structure is obtained where the proportion of the mixture is changed in two steps, instead of being varied continuously and gradually. Thus, a body of Teflon or Kel-F molding powder may have superimposed thereon a layer of a Kel-F or a Teflon-copper powder mix in which the copper content may vary within the range from 30 to 45 percent, by weight, and then a second layer of a mixture added, in which the copper content is 70 percent or more, by weight.

This arrangement is schematically illustrated in FIG. 1, where a body of Teflon powder 11 is shown, covered and superposed by a first layer of a Teflon-copper mixture containing 40% copper by weight as indicated by the layer 12, and then by a second layer 13 of a mixture of Teflon and copper containing about 70% of copper by weight. The two Teflon-copper mixtures 12 and 13 should be thoroughly mixed to provide a fairly homogeneous disposition of the copper particles among the Teflon particles. For convenience the copper content will be referred to as 40% and 70% mixtures, but those percentages are not in themselves critical, since the proportions of the respective mixes may be varied, and a firm cohesive bond obtained in the body and at the surface.

The column of material as shown in FIG. 1 is subsequently subjected to sufficient compression to reduce the height of the column to about one-fourth of its initial height, whereupon the elevational section will take a form similar to that shown in FIG. 2. For ordinary purposes, the entire column may be considered to have been compresesd uniformly in each of the layers. For the ordinary purposes for which the products of the present invention may be utilized, actually uniformity of compression in the several layers is not essential, and any variation from actual uniform compression is of no significance.

The important feature at this point is that a body of pure Teflon 11 is now integrally bonded in a unified body structure, with a portion of its body containing a preponderant portion of metallic content, with the minor proportion of Teflon serving as a cohesive bonding medium with the pure Teflon body, so that the surface of the Teflon body is so preponderantly metal that a metal layer may be bonded thereto, for electrical connection, for mechanical sealing to withstand vacuum, and for mechanical structural support.

The depth of the Teflon material in the body is not limited to any specific dimension, but may be varied according to the dimension that is ultimately desired, for the operation required. It may be shallow or deep. FIG. 1 is merely illustrative. After the quantity of powder is compressed to the condition shown in FIG. 2, which corresponds substantially to the desired final dimension, the compressed unit body 14 is then sintered at a temperature of about 700 degrees F. The specific gravity of Teflon is within the range of 2.1 to 2.3, and it is therefore considerably lighter than any of the metals which might be mixed with the Teflon, in accordance with this invention, to provide an outer metallic surface. During the compression of the molding operation, therefore, even though the mixture of the top layer would be homogeneously distributed, the copper particles or other metal that might be employed, might be pressed downward somewhat from the top surface plane. Under such conditions, it is quite possible that the top surface of the molded body would not be uniformly and continuously metallic, sufficient under all conditions, to receive a direct soldering connection, completely and uniformly over the entire layer surface. Therefore, in the interest of obtaining uniformity of the metallic surface layer, an additional metallic layer may be deposited and bonded onto the metallic surface of the molded body of FIG. 2. Although the metal accepting condition of the molded body, as in FIG. 2, may be adequate to receive a metal layer immediately on the molded surface, without any further surface conditioning, it is desirable, both as a matter of uniform procedure and as a matter of catching the few units in which the tangible metallic plane might be depressed beneath the absolute outer plane of the compressed body, to subject the surface of the molded unit to a slight mechanical scrubbing action over the metallized portion. The surface may then be subjected to a complete metallizing action, with assurance that the entire surface can be covered with a metal layer that will be strongly held and bonded to the metallic content of the molded body. Such a construction is shown by the molded unit 14 in FIG. 3, wherein an additional layer of metal 15 is overlaid on the molded body 14.

The overlaid metal 15 may be electro-deposited, tinned, or soldered, or metal-sprayed, or cemented, onto the molded bonded layer 13, 12 of the molded body 14. The finished body thus formed as stock material may be machined to desired shape.

FIG. 4 shows a structural unit of a body of Teflon, formed to have two metallic regions with metallic surface layers that may be utilized to enable the Teflon body 18 to serve as a header, or sealing insulator, that may be directly connected to a supporting metal member 19, and then serve, in turn, as a support for an electrical conductor or electrode 21, that may serve as a terminal for connection to an external circuit conductor 22.

In the insulator construction, shown in FIG. 4, the hollow tubular insulator body 18 is provided with a molded ring portion 23 of metallic mixture, the outer surface of which has preferably been tinned, after having been previously formed and treated as explained in connection with FIGS. 1, 2 and 3. The metal supporting member 19 is shown as provided with an opening 24 that is but slightly larger than the external diameter of the insulator body 18 in the region of the metallized portion 23. The inner circular edge of the metal supporting member 19 at the opening 24 is also preferably tinned, so that the tin surfaces of the supporting member 19 and of the metallized portion 23 of the insulator 18 may be mechanically bonded by a simple soldering operation. In similar manner, the center axial passage of the insulator 18 is metallized along a short distance axially, as may be desired, and is also tinned to be able to receive a solder connection. The top of the rod 21 is likewise tinned, and the rod may then be readily soldered to the metallized region 26 of the insulator 18 by a simple soldering operation, after which the terminal connection may be made to the conductor 22.

In FIG. 5 is illustrated a further modification and application of the invention, for use with a contact member employed for high-frequency operation. In such operation, it may be desirable in many cases to provide a degree of resiliency behind the contact that will tend to absorb much of the impact forces that result from a pair of vibrating contacts recurringly striking each other. As shown in FIG. 5, a standard contact 31 is supported on its arm 32 to be engaged by a novel contact 33, of the present invention, that is supported on its arm 34. Either or both of the supporting arms 32 and 34 may be movable, to effect engagement and disengagement of the two contacts 31 and 33.

The modified contact 33 is shown as embodying a middle body section 35 of Teflon with the top and bottom regions 36 and 37 metallized in accordance with this invention, with contact 33 bonded to the arm 34 with a suitable cementing or bonding metal layer 38 between the metallized section 37 and the arm 34. On the upper surface of the modified contact 33 is seated a heavy contact element 39 that is cemented or bonded to the metallized section 36 by a suitable metallic interlayer 40. The interlayer 40 may be of solder or of metallic cement or of any soft white metal or alloy having a melting point or fluid phase below 700 degrees F. A suitable electrical connection is made from heavy contact 39 to the arm 34 by a conductor 41.

By means of the construction shown in FIG. 5, the impact stresses of the high frequency contacts are absorbed by the body of Teflon between the arm 34 and the contact 39.

FIG. 6 shows an arrangement for joining an annular ring 45 of Teflon to the wall of a glass vessel 46 around an opening 47 into the vessel so a suitable sealing connection may be made to the glass vessel, where a vacuum operation is to be performed, for example. The Teflon body 45 is provided with a metallized portion 44 which is metallically bonded to a metallized annular disc 51 on the glass by a simple solder connection 52.

In FIG. 7 is illustrated a simple arrangement whereby two molded Teflon bodies 55 and 56 may be joined and bonded, without the intermediary of the usual external mechanical members that would be otherwise required to hold the two Teflon bodies together under compression. Each of the Teflon bodies 55 and 56 is provided with a metallized portion 57 and 58, respectively, and those portions are respectively overlaid with a metallic layer, such as an electro-deposition 59, or a thin layer of solder or the like. The two individual metallic layers thus formed on the respective Teflon bodies 55 and 56 are then easily and readily metallically connected and bonded by a solder joint 60.

FIG. 8 shows an application of a treated Teflon unit 61 for hermetically sealing and enclosing a container 62, which for the purpose of illustration, in this case, may be considered to be for an electronic component, such as a condenser, from which a terminal conductor 63 is to be brought out. In this case, the Teflon body 61 is shown as being formed substantially as an annular ring, with both its outer periphery and the periphery of the central opening metallized, in accordance with this invention, at the regions 64 and 65. Those metallized regions are then provided with a superposed layer of metal and tinned. Similarly, the inside surface of the container 62 is tinned near the opening, where it will be engaged by the sealing washer 61. The terminal conductor 63 is similarly tinned along its length where it will be engaged by the sealing Teflon washer 61. After the Teflon washer is assembled on the conductor 63 and slipped into position at the mouth of the receptacle 62, that part of the receptacle is then dipped into a tin bath, to immerse the washer, which serves to seal the electrical conductor 63 and the container 62 to the tinned surfaces of the Teflon body 61, thereby sealing and closing the receptacle 62.

One of the particular advantages of Teflon for the construction shown in FIG. 8 is that the shock-absorbing quality of Teflon permits the unit in container 62 to be utilized more safely and satisfactorily for applications where the container and its enclosed unit would be subjected to considerable vibration. For example, if the unit were a condenser mounted on a vehicle where the mounting would be subjected to shaking and vibration, the entire unit would be subjected to shock that might be harmful in the case of a rigid or brittle material connected between the conductor electrode and the wall of the vessel. The Teflon sealing unit as modified herein, however, permits the operation of such a device under such vibrating conditions without detrimental effects.

FIG. 9 shows a further modification of the invention wherein a Teflon base is utilized as a support for a formed electric circuit, commonly encompassed within the general classification of "printed circuits." As shown in FIG. 9, a block 71 of Teflon may be formed with suitable grooving 72 and 73 corresponding to the circuit arrangement that will be ultimately desired, and an opening 75 may be formed to extend through the depth or thickness of the body, where an electrical connection is desired to be taken through the body to permit a crossover, or where a terminal connection may be desired on the underside of the Teflon base 71. In order to provide the regular metallic conductors in the grooves 72 and 73, Teflon-metal mixtures with variable proper proportions may be laid in those grooves, in a manner corresponding to the disposition of the two layers 12 and 13 on top of the pure Teflon 11 in FIG. 1, and the two layers of mixed powders may then be compressed in a similar manner to a compact molded formation before the entire body is subjected to a sintering temperature. In the case of the passage 74 through the entire depth of the body 71, it is desirable to utilize a suspensoid of Teflon, in which it is possible to obtain a mixture with a copper content running 80% or more. The suspensoid method may, of course, be equally well employed for filling the channels 72 and 73, since the high copper content that may be obtained assures a satisfactory metal base for the metallic overlay, which may be formed by electro-deposition or by dipping the entire unit in a tin bath, or by other metal depositing methods. In that case, the non-stick surface of the Teflon, where it has not been metallized will not pick up any of the tin from the bath; and, thus, only the metallized regions of the Teflon surface will take on a tin surface.

In FIG. 10 is shown a Teflon spacer support 81 for use in a two-wire shielded cable. The spacer 81 consists of a circular disc portion 82 having two spaced passages 83 and 84, and two oppositely disposed co-axial ring portions 85 and 86. The inner peripheral regions of the two passages 83 and 84 are formed with the copper content, and then with a metallic bonded layer, as in FIGS. 1, 2 and 3. Similarly, the peripheral regions of the two rings 85 and 86 are formed with the copper content, and a bonded metallic layer. All of the surfaces of those metal layers are then tinned to permit the simple insertion and soldering of bare conductors 87 and 88 in the passages 83 and 84, and the application and soldering of shielding tubes 89 and 90 over the supports. The shielded cable thus formed is pressure-sealed and may be filled with a suitable inert gas.

For convenience, reference has been made to copper as the powdered metal used as the filler for establishing the base for the metal surface bond. Any other metal may be employed, according to the surface characteristics that may be desired. The important thing is to use the Teflon powder and the metal powder of very fine mesh and homogeneously mixed at the various proportions employed. As already indicated, the proportion of metal content may be varied gradually or in steps, to achieve the complete bonding between the Kel-F or Teflon powder and the metal powder, to form an integrated solid body, to whose surface a continuous monolithic metal layer may be bonded, by any suitable method, to provide a metallic surface which may then be joined to any other suitable surface by soldering or low temperature brazing, or by suitable metal cementing materials.

This invention is not limited to the disposition of the materials to the specific arrangements shown, or to the structures illustrated, but may be variously modified without departing from the spirit and scope of the invention as it may be claimed.

I claim:
1. An article of manufacture comprising a plastic component of a thermoplastic polymer of trifluorochloroethylene and a metallic component comprising finely divided metal particles, said article ranging in composition from a major proportion of the metallic component at a surface to none of the metallic component at the opposite surface.

2. An article of manufacture comprising a plastic component of a thermoplastic polymer of trifluorochloroethylene and a metallic component comprising finely divided metal particles, said article ranging in composition from at least 70% by weight of the metallic component at a surface to none of the metallic component at the opposite surface.

3. An article of manufacture comprising a plastic component of a thermoplastic polymer of trifluorochloroethylene and a metallic component comprising finely divided copper particles, said article ranging in composition from at least 70% by weight of the metallic component at a surface to none of the metallic component at the opposite surface.

4. A bonding layer capable of being soldered to metal and molded to a layer of thermoplastic polymer of trifluorochloroethylene, said layer comprising a uniform molded composition of 70% to 80% by weight of metal powder and a thermoplastic polymer of trifluorochloroethylene.

5. An article of manufacture comprising a plastic component of a thermoplastic polymer of trifluorochloroethylene and a metallic component comprising finely divided copper particles, said article ranging in composition from about 80% by weight of copper at a surface to none of the metallic component at the opposite surface.

6. A sealing device for an electrical element comprising a perforated cup-shaped solid article adapted to be soldered on the inner surface to a metal conductor on the electrical element with a lead wire passing through the perforation, and adapted to be molded on the outer surface to a sealing layer of polymerized trifluorochloroethylene, said article comprising a plastic component of a thermoplastic polymer of trifluorochloroethylene and a metallic component comprising finely divided metal particles, said article ranging in composition from a major proportion of the metallic component at the inner surface to none of the metallic component at the outer surface.

7. A sealing device for an electrical element comprising a perforated cup-shaped solid article adapted to be soldered on the inner surface to a metal conductor on the electrical element with a lead wire passing through the perforation, and adapted to be molded on the outer surface to a sealing layer of a polymerized material from the group consisting of polytetrafluoroethylene and trifluorochlorethylene, said article comprising a plastic component of said group consisting of polytetrafluoroethylene and trifluorochloroethylene and a metallic component comprising finely divided metal particles, said article ranging in composition from at least 70% by weight of the metallic component at the inner surface to none of the metallic component at the outer surface.

8. A sealing device for an electrical element comprising a perforated cup-shaped solid article adapted to be soldered on the inner surface to a metal conductor on the electrical element with a lead wire passing through the perforation, and adapted to be molded on the outer surface to a sealing layer of a polymerized material from the group consisting of polytetrafluoroethylene and trifluorochlorethylene, said article comprising a plastic component of a thermoplastic polymer of said group consisting of polytetrafluoroethylene and trifluorochloroethylene and a metallic component comprising finely divided copper particles, said article ranging in composition from at least 70% by weight of the metallic component at the inner surface to none of the metallic component at the outer surface.

9. A sealing device for an electrical element comprising a perforated cup-shaped solid article adapted to be soldered on the inner surface to a metal conductor on the electrical element with a lead wire passing through the perforation, and adapted to be molded on the outer surface to a sealing layer of a polymerized material from the group consisting of polytetrafluoroethylene and trifluorochloroethylene, said article comprising a plastic component of a thermoplastic polymer of said group consisting of polytetrafluoroethylene and trifluorochloroethylene and a metallic component comprising finely divided copper particles, said particles ranging in composition to at least 70% by weight of copper at the inner surface to none of the metallic component at the outer surface.

10. A sealing device for an electrical element comprising a perforated cup-shaped solid article adapted to be soldered on the inner surface to a metal conductor on the electrical element with a lead wire passing through the perforation, and adapted to be molded on the outer surface to a sealing layer of a polymerized material from the group consisting of polytetrafluoroethylene and trifluorochloroethylene, said article comprising a uniform molded composition of at least 70% by weight of metal powder and a thermoplastic polymer of the selected material of said group.

11. The sealing device of claim 10, wherein the molded composition comprises at least 70% by weight of copper powder.

References Cited in the file of this patent

UNITED STATES PATENTS

| Number | Name | Date |
| --- | --- | --- |
| 2,265,352 | Corbin et al. | Dec. 9, 1941 |
| 2,389,641 | Sarbach | Nov. 27, 1945 |
| 2,392,388 | Joyce | Jan. 8, 1946 |
| 2,396,629 | Alfthan et al. | Mar. 19, 1946 |
| 2,400,091 | Alfthan | May 14, 1946 |
| 2,400,099 | Brubaker et al. | May 14, 1946 |
| 2,431,474 | Gaudenzi et al. | Nov. 25, 1947 |
| 2,456,262 | Fields | Dec. 14, 1948 |
| 2,484,484 | Berry | Oct. 11, 1949 |
| 2,485,691 | Bogese | Oct. 25, 1949 |
| 2,538,808 | Swiss | Jan. 23, 1951 |
| 2,638,523 | Rubin | May 12, 1953 |